(12) United States Patent
Maeda et al.

(10) Patent No.: US 10,913,878 B2
(45) Date of Patent: Feb. 9, 2021

(54) METHOD OF PRODUCING LAMINATE

(71) Applicant: MITSUI CHEMICALS, INC., Tokyo (JP)

(72) Inventors: Takahiro Maeda, Dusseldorf (DE); Yoshiyuki Ogawa, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/488,411

(22) PCT Filed: Mar. 22, 2018

(86) PCT No.: PCT/JP2018/011344
§ 371 (c)(1),
(2) Date: Aug. 23, 2019

(87) PCT Pub. No.: WO2018/180862
PCT Pub. Date: Oct. 4, 2018

(65) Prior Publication Data
US 2020/0239742 A1 Jul. 30, 2020

(30) Foreign Application Priority Data

Mar. 29, 2017 (JP) .................. 2017-064999

(51) Int. Cl.
| | | |
|---|---|---|
| *C09J 123/20* | (2006.01) | |
| *C09J 123/14* | (2006.01) | |
| *B32B 27/32* | (2006.01) | |
| *C08L 23/20* | (2006.01) | |
| *C08L 23/14* | (2006.01) | |
| *C09J 7/29* | (2018.01) | |
| *C09J 7/30* | (2018.01) | |
| *B32B 7/12* | (2006.01) | |
| *B32B 27/08* | (2006.01) | |
| *B32B 27/36* | (2006.01) | |
| *B32B 38/00* | (2006.01) | |
| *C09J 123/18* | (2006.01) | |

(52) U.S. Cl.
CPC ............... *C09J 7/29* (2018.01); *B32B 7/12* (2013.01); *B32B 27/08* (2013.01); *B32B 27/32* (2013.01); *B32B 27/36* (2013.01); *B32B 38/0012* (2013.01); *C09J 7/30* (2018.01); *B32B 38/0036* (2013.01); *B32B 2038/0028* (2013.01); *B32B 2329/00* (2013.01); *B32B 2367/00* (2013.01); *B32B 2377/00* (2013.01); *C08L 23/14* (2013.01); *C08L 23/20* (2013.01); *C09J 123/14* (2013.01); *C09J 123/18* (2013.01); *C09J 123/20* (2013.01); *C09J 2423/00* (2013.01); *C09J 2423/10* (2013.01); *C09J 2467/005* (2013.01)

(58) Field of Classification Search
CPC ...... C09J 123/20; C09J 123/18; C09J 123/14; C09J 123/16; C09J 7/29; C09J 7/30; B32B 27/32; B32B 27/36; B32B 38/0036; C08L 23/20; C08L 23/10; C08L 23/12; C08L 23/14
See application file for complete search history.

(56) References Cited

U.S. PATENT DOCUMENTS

| | | | | |
|---|---|---|---|---|
| 4,487,885 A | * | 12/1984 | Adur | .................. B32B 27/04 |
| | | | | 525/74 |
| 5,695,838 A | * | 12/1997 | Tanaka | .................. B32B 7/12 |
| | | | | 428/35.2 |
| 6,846,532 B1 | | 1/2005 | Bensur | |
| 8,197,947 B2 | * | 6/2012 | Botros | .................. B32B 27/38 |
| | | | | 428/523 |
| 8,426,030 B2 | * | 4/2013 | Botros | .................. B32B 27/32 |
| | | | | 428/523 |
| 8,445,582 B2 | * | 5/2013 | Yasui | .................. B32B 27/306 |
| | | | | 524/522 |
| 2009/0275700 A1 | * | 11/2009 | Mochizuki | .............. C08L 53/00 |
| | | | | 525/71 |

(Continued)

FOREIGN PATENT DOCUMENTS

| | | | | | |
|---|---|---|---|---|---|
| JP | | 4-300933 A | * | 10/1992 | .............. C08L 23/10 |
| JP | | H04-300933 A | | 10/1992 | |
| JP | | H09-111069 A | | 4/1997 | |
| JP | | 2000-143903 A | * | 5/2000 | .............. C08L 23/14 |
| JP | | 2000-143903 A | | 5/2000 | |
| JP | | 2002-326660 A | | 11/2002 | |
| JP | | 2006-249392 A | | 9/2006 | |

(Continued)

OTHER PUBLICATIONS

International Searching Authority, "International Search Report," issued in connection with International Patent Application No. PCT/JP2018/011344, dated Jun. 26, 2018.

(Continued)

*Primary Examiner* — Rip A Lee

(74) *Attorney, Agent, or Firm* — Foley & Lardner LLP

(57) ABSTRACT

A method of producing a laminate comprising a heat treatment step under a temperature condition of 80-140° C. for 5-120 minutes, wherein the laminate satisfies the following requirements: (1) an adhesive layer (I) with 97-70% by weight of a propylene copolymer (A) and 3-30% by weight of a copolymer (B) having a structural unit derived from butane (100% by weight); (2) the copolymer (A) has a melting point within a specific range and includes less than 1 mol % of structural unit from butane; (3) the copolymer (B) has a melting point within a specific range and includes 1 mol % or more of structural unit from butane; (4) the adhesive layer (I) has a polymer (C) with a structural unit from at least one graft monomer selected unsaturated carboxylic acids and derivatives thereof, and, (5) a substrate layer (II) includes a polyester resin.

9 Claims, 1 Drawing Sheet

(56) References Cited

U.S. PATENT DOCUMENTS

| | | |
|---|---|---|
| 2010/0063198 A1 | 3/2010 | Yasui et al. |
| 2010/0173168 A1 | 7/2010 | Yasui et al. |
| 2011/0129666 A1 | 6/2011 | Botros et al. |
| 2012/0171405 A1 | 7/2012 | Pasquali et al. |
| 2019/0300688 A1* | 10/2019 | Iwashita ............... C08F 222/06 |

FOREIGN PATENT DOCUMENTS

| | | |
|---|---|---|
| WO | WO-2007/086425 A | 8/2007 |
| WO | WO-2008/093805 A1 | 8/2008 |
| WO | WO-2012/115195 A1 | 8/2012 |
| WO | WO-2008/016460 A1 | 1/2018 |

OTHER PUBLICATIONS

International Searching Authority, "Written Opinion," issued in connection with International Patent Application No. PCT/JP2018/011344, dated Jun. 26, 2018.

Extended European Search Report dated Nov. 13, 2020 for corresponding European Patent Application No. 18774310.9.

* cited by examiner

[Figure 1]
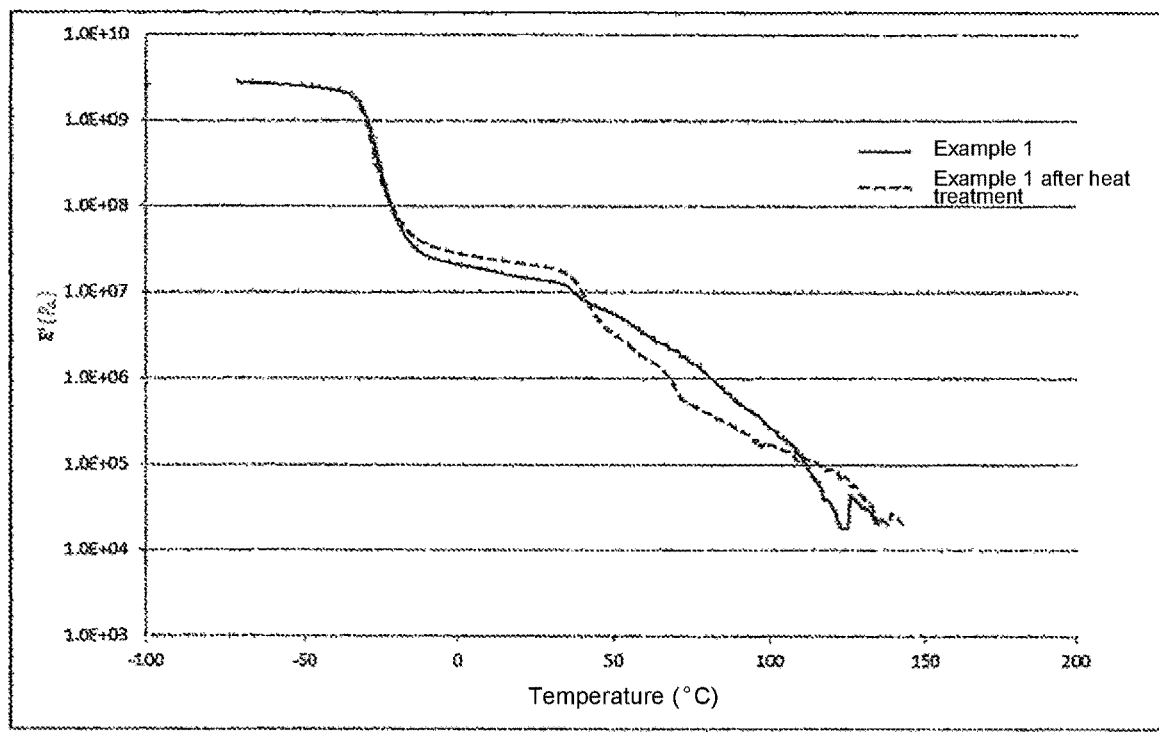
[Figure 2]
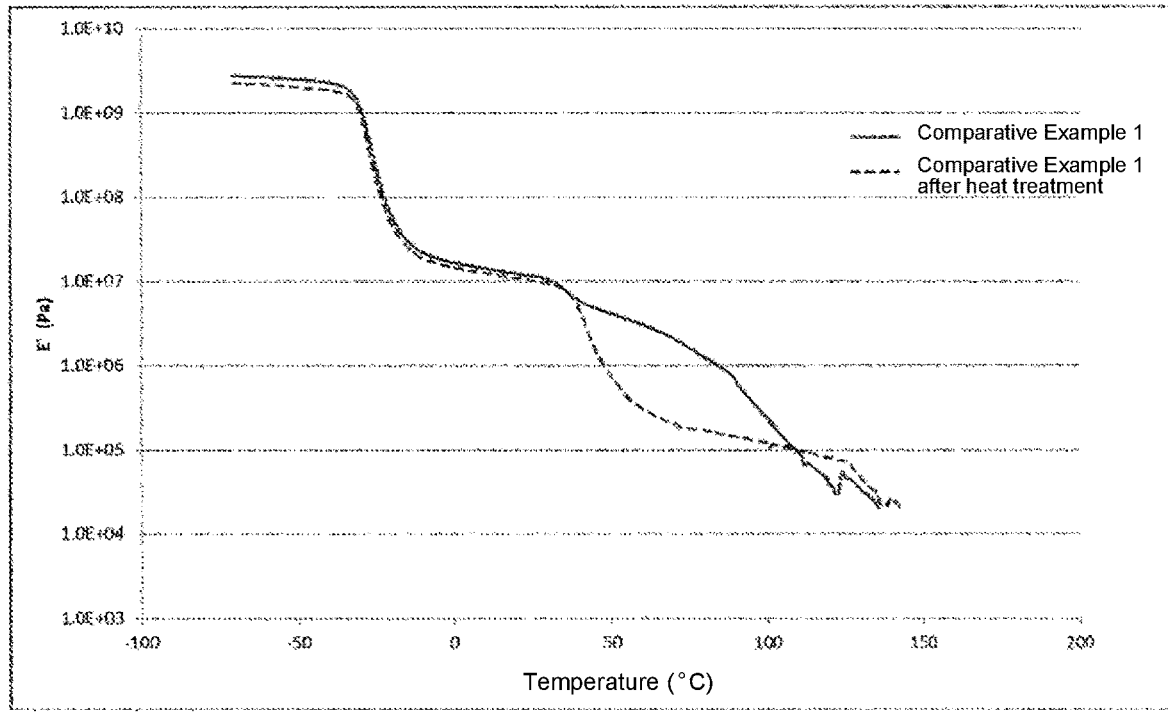

METHOD OF PRODUCING LAMINATE

RELATED APPLICATIONS

The present application claims priority under 37 U.S.C. § 371 to International Patent Application No. PCT/JP2018/011344, filed Mar. 22, 2018, which claims priority to and the benefit of Japanese Patent Application No. 2017-064999, filed on Mar. 29, 2017. The contents of these applications are hereby incorporated by reference in their entireties.

TECHNICAL FIELD

The present invention relates to a method of producing a laminate, and specifically relates to a laminate including a novel adhesive layer. More specifically, one embodiment according to the present invention relates to a laminate having high initial adhesiveness and also having a high adhesive strength after a thermal history.

BACKGROUND ART

Multi-layer films comprising a layer composed of a polar polymer having gas barrier properties, such as a saponified product of ethylene vinyl acetate copolymer (EVOH), polyamide (PA), or polyester (such as polyethylene terephthalate (PET)) and a layer composed of a resin having high steam barrier properties and high oil resistance, such as polypropylene (PP) or polyethylene (PE), are used as films for packaging materials.

Graft-modified PP or PE is used as an adhesive layer which reacts with this polar polymer for adhesion. Among these polymers, PP is widely used as a thermoplastic molding material having high rigidity, heat resistance, and transparency while PP has inferior flexibility. For this reason, when PP is used as an adhesive, usually, a soft rubber component is compounded with PP. Such compounding of a soft rubber component with PP increases a reactivity of EVOH or PA with graft-modified moieties of PP, providing a polypropylene adhesive having improved adhesiveness (for example, Patent Literatures 1 and 2). On the other hand, it is known that this compounding causes a problem such that the adhesiveness reduces under a thermal history at 40° C. or more.

To solve this problem, proposed is a polypropylene adhesive having high adhesiveness after a thermal history by adding a propylene-ethylene copolymer optimized as a soft rubber component (Patent Literature 3).

CITATION LIST

Patent Literature

Patent Literature 1: JP-A-H9-111069
Patent Literature 2: JP-A-H4-300933
Patent Literature 3: WO 2007/086425

SUMMARY OF INVENTION

Technical Problem

Unfortunately, the adhesive layer prepared with the adhesive according to Patent Literature 3 is room for improvement in adhesiveness to a substrate composed of a polyester resin such as PET, particularly, in stable adhesiveness during and after the thermal history such as retorting or boiling.

One embodiment according to the present invention provides a laminate having high adhesiveness to a substrate comprising a polyester resin, particularly, having a stable adhesiveness even after heat treatment such as retorting or boiling.

Solution to Problem

As a result of extensive research to solve the above problem, the present inventor has found that a constitutional example described below can solve the problem, and has completed the present invention.

The constitutional example of the present invention is as follows.

A method of producing a laminate according to one embodiment according to the present invention is a method of producing a laminate comprising a polypropylene adhesive layer (I) and a substrate layer (II), the method comprising:

a heat treatment step of performing a heat treatment under a temperature condition of 80 to 140° C. for 5 to 120 minutes, wherein the laminate satisfies at least the following requirements (1) to (5):

(1) the adhesive layer (I) comprises 97 to 70% by weight of a propylene copolymer (A), and 3 to 30% by weight of a copolymer (B) having a structural unit derived from butene (where the total of the copolymers (A) and (B) is 100% by weight), (2) the copolymer (A) has a melting point (TmA) of 70 to 120° C. measured with a differential scanning calorimeter (DSC), and includes less than 1 mol % of a structural unit derived from butene, (3) the copolymer (B) has a melting point (TmB) of 130° C. or less measured with a differential scanning calorimeter (DSC), and includes 1 mol % or more of the structural unit derived from butene, (4) the adhesive layer (I) comprises a polymer (C) having a structural unit derived from at least one graft monomer selected from the group consisting of unsaturated carboxylic acids and derivatives thereof, and (5) the substrate layer (II) comprises a polyester resin.

Advantageous Effects of Invention

One embodiment according to the present invention can facilitate production of a laminate having high initial adhesiveness (adhesiveness before heat treatment) to a substrate comprising a polyester resin, and maintaining a stable adhesiveness with a little change in flexibility even after a heat treatment such as boiling, retorting, or annealing.

BRIEF DESCRIPTION OF DRAWINGS

FIG. 1 is a graph of the storage elastic modulus (E') of a sheet prepared using an adhesive prepared in Example 1 and that of a sheet obtained by heat treating the sheet at 121° C. for 30 minutes under an air environment.

FIG. 2 is a graph of the storage elastic modulus (E') of a sheet prepared using an adhesive prepared in Comparative Example 1 and that of a sheet obtained by heat treating the sheet at 121° C. for 30 minutes under an air environment.

DESCRIPTION OF EMBODIMENTS

<<Method of Producing Laminate and Laminate>>

According to one embodiment according to the present invention, a method of producing a laminate (hereinafter, also referred to as "the present method") comprising a polypropylene adhesive layer (I) and a substrate layer (II) comprises:

a heat treatment step of performing a heat treatment under a temperature condition of 80 to 140° C. for 5 to 120 minutes, wherein the laminate satisfies at least requirements (1) to (5) described above.

Such a method can facilitate production of a laminate having high initial adhesiveness to a substrate comprising a polyester resin, and maintaining a stable adhesiveness with a little change in flexibility even after heat treatment such as boiling, retorting, or annealing.

In particular, it has been conventionally believed that the adhesiveness after the heat treatment described above reduces compared to the initial adhesiveness. Unexpectedly, one embodiment according to the present invention can also provide a laminate having higher adhesiveness after the heat treatment than the initial adhesiveness.

The laminate according to one embodiment according to the present invention satisfies at least the following requirements (1) to (5), and comprises a polypropylene adhesive layer (I) and a substrate layer (II).

(1) The adhesive layer (I) comprises 97 to 70% by weight of a propylene copolymer (A), and 3 to 30% by weight of a copolymer (B) having a structural unit derived from butene (where the total of the copolymers (A) and (B) is 100% by weight).

(2) The copolymer (A) has a melting point (TmA) of 70 to 120° C. measured with a differential scanning calorimeter (DSC), and includes less than 1 mol % of a structural unit derived from butene.

(3) The copolymer (B) has a melting point (TmB) of 130° C. or less measured with a differential scanning calorimeter (DSC), and includes 1 mol % or more of the structural unit derived from butene (4) The adhesive layer (I) comprises a polymer (C) having a structural unit derived from at least one graft monomer selected from the group consisting of unsaturated carboxylic acids and derivatives thereof.

(5) The substrate layer (II) comprises a polyester resin.

The method of producing a laminate according to one embodiment according to the present invention is not particularly limited and may be any conventionally known method; however, preferred is the present method, for example, because a laminate having high initial adhesiveness and high adhesiveness after heat treatment can be easily produced.

The laminate according to one embodiment according to the present invention and a laminate prepared by the present method are also referred to as "the present laminate" below.

The present laminate has high initial adhesiveness and high adhesiveness after heat treatment. For this reason, the laminate, even if undergoing a heat treatment required according to the application of the present laminate, has sufficient adhesiveness, less leakage of the contents, and high durability.

For this reason, the present laminate can be suitably used as containers, for example, for storing and transporting, for example, food products, liquids, and gases, particularly, for example, as a pouch packaging material for retort food products.

<Polypropylene Adhesive Layer (I)>

The polypropylene adhesive layer (I) is prepared using 97 to 70% by weight of a propylene copolymer (A), and 3 to 30% by weight of a copolymer (B) having a structural unit derived from butene (where the total of the copolymers (A) and (B) is 100% by weight).

One or more copolymers (A) may be contained in the adhesive layer (I), and one or more copolymers (B) may be contained in the adhesive layer (I).

Such an adhesive layer included in the present laminate provides high adhesiveness to a substrate comprising a polyester resin, particularly, high initial adhesiveness and high adhesiveness after heat treatment.

The adhesive strength (T-peel method, tensile tester, 23° C., crosshead speed: 50 mm/min) of the adhesive layer (I) to the substrate comprising a polyester resin is preferably 1.7 to 5.0 N/15 mm, more preferably 1.8 to 3.5 N/15 mm.

A laminate having the adhesive strength within this range has high initial adhesiveness.

After retort treatment of the laminate comprising the adhesive layer (I) and the polyester resin under hot water at 121° C. for 30 minutes, the adhesive strength (T-peel method, tensile tester, 23° C., crosshead speed: 50 mm/min) of the adhesive layer (I) to the substrate comprising the polyester resin is preferably 1.1 to 5.0 N/15 mm, more preferably 1.5 to 4.0 N/15 mm.

A laminate having the adhesive strength within this range has high adhesiveness after heat treatment.

For example, to facilitate production of an adhesive layer having high initial adhesiveness and high adhesiveness after heat treatment, the adhesive layer (I) preferably contains a component soluble in normal decane at 80° C. The content of the soluble component is preferably 5 to 30% by mass, more preferably 10 to 30% by mass.

The soluble component includes preferably 1 mol % or more, more preferably 10 to 90 mol % of a structural unit derived from butene.

The thickness of the adhesive layer (I) is not limited, and the thickness may be appropriately selected according to the desired application. For example, to facilitate production of a laminate having sufficient adhesiveness, the thickness is preferably 1 to 500 μm, more preferably 2 to 400 μm.

[Propylene Copolymer (A)]

Examples of the propylene copolymer (A) include, but should not be limited to, copolymers of propylene and α-olefins having 2 or 5 to 24 carbon atoms. The copolymer (A) is a polymer different from the polymer (C) described below.

One or more of the α-olefins may be used.

As the α-olefin, ethylene is preferred, for example, to facilitate production of a laminate having high adhesiveness to a substrate comprising a polyester resin.

The copolymer (A) is a polymer including less than 1 mol % of a structural unit derived from butene.

The copolymer can contain the α-olefin in any amount. For example, to facilitate production of a laminate having high adhesiveness to a substrate comprising a polyester resin, the content is preferably 5 to 30 mol %. For example, to facilitate production of a laminate having high adhesiveness after heat treatment step, the content is more preferably 10 to 30 mol %, particularly preferably 15 to 25 mol %.

The melting point (TmA) of the copolymer (A) measured by DSC is 70 to 120° C., preferably 70 to 110° C., for example, to facilitate production of a laminate having high adhesiveness to a substrate comprising a polyester resin.

TmA can be specifically measured by the method described in Examples below.

The MFR of the copolymer (A) according to ASTM D1238 (230° C., load of 2.16 kg) is not particularly limited, but the MFR is preferably 0.1 to 100 g/10 min, more preferably 0.5 to 50 g/10 min, for example, in terms of facilitating production of an adhesive layer (I) having high formability.

The density of the copolymer (A) measured according to JIS K7112 is preferably 0.80 to 0.91 g/cm$^3$, more preferably 0.85 to 0.90 g/cm$^3$.

The molecular weight distribution (Mw/Mn) of the copolymer (A) is preferably 1.5 to 5.0, more preferably 1.8 to 4.0.

The method of preparing the copolymer (A) is not particularly limited, but the copolymer (A) can be prepared by a well-known method using a well-known catalyst such as a Ziegler-Natta catalyst or a metallocene catalyst. The copolymer (A) is preferably a crystalline polymer. If the copolymer (A) is the copolymer of propylene and α-olefin, it may be a random copolymer, or may be a block copolymer. Furthermore, the copolymer (A) is preferably a copolymer which satisfies formability and provides a laminate having a strength withstanding the use. The stereoregularity and molecular weight of the copolymer (A) is not particularly limited within a range not impairing the advantageous effects of the invention.

A commercially available resin can also be used as it is.

The amount of the copolymer (A) contained in the polypropylene adhesive layer (I) is 97 to 70% by weight, preferably 95 to 75% by weight, more preferably 95 to 80% by weight, particularly preferably 90 to 80% by weight relative to 100% by weight of the total of the copolymers (A) and (B).

An amount of the copolymer (A) within this range can facilitate production of a laminate having high initial adhesiveness and high adhesiveness after heat treatment in a good balance.

[Copolymer (B) Having Structural Unit Derived from Butene]

The copolymer (B) is not particularly limited as long as it has a structural unit derived from butene; however, examples thereof include copolymers of butene and α-olefin having 2 to 24 carbon atoms. The copolymer (B) is a polymer different from the polymer (C) described below.

One or more of the α-olefins may be used.

The α-olefin is preferably propylene because obtained copolymer (B) has high miscibility with the copolymer (A) and can facilitate production of a laminate having high adhesiveness to a substrate comprising a polyester resin.

The copolymer (B) is a polymer including 1 mol % or more of the structural unit derived from butene. The content of the structural unit derived from butene in copolymer (B) is not particularly limited, but the content is preferably 10 to 99 mol %. For example, because of higher adhesiveness after heat treatment, the content is more preferably 12 to 90 mol %, still more preferably 15 to 85 mol %, particularly preferably 20 to 80 mol %.

The melting point (TmB) of the copolymer (B) measured by DSC is 130° C. or less, preferably 110° C. or less, more preferably 55 to 110° C., for example, to facilitate production of a laminate having high adhesiveness to a substrate comprising a polyester resin.

TmB can be specifically measured by the method described in Examples below.

The MFR of the copolymer (B) according to ASTM D1238 (230° C., load of 2.16 kg) is not particularly limited; however, for example, to facilitate production of an adhesive layer (I) having high formability, the MFR is preferably 0.1 to 100 g/10 min, more preferably 0.5 to 50 g/10 min.

The density of the copolymer (B) measured according to JIS K7112 is preferably 0.87 to 0.91 g/cm$^3$, more preferably 0.88 to 0.90 g/cm$^3$.

The molecular weight distribution (Mw/Mn) of the copolymer (B) is preferably 1.5 to 5.0, more preferably 1.8 to 4.0.

The method of preparing the copolymer (B) is not particularly limited, and the copolymer (B) can be prepared by a well-known method using a well-known catalyst such as a Ziegler-Natta catalyst or a metallocene catalyst. The copolymer (B) is preferably a crystalline polymer. If the copolymer (B) is the copolymer of butene and α-olefin, it may be a random copolymer, or may be a block copolymer. Furthermore, the copolymer (B) is preferably a copolymer which satisfies formability, and provides a laminate having a strength withstanding the use. The stereoregularity and molecular weight of the copolymer (B) is not particularly limited within a range not impairing the advantageous effects of the invention.

A commercially available resin can also be used as it is.

The amount of the copolymer (B) contained in the polypropylene adhesive layer (I) is 3 to 30% by weight, preferably 5 to 25% by weight, more preferably 5 to 20% by weight, particularly preferably 10 to 20% by weight relative to 100% by weight of the total of the copolymers (A) and (B).

An amount of the copolymer (B) within this range can facilitate production of a laminate having high initial adhesiveness and high adhesiveness after heat treatment in a good balance.

[Polymer (C) Including Structural Unit Derived from Graft Monomer]

The polypropylene adhesive layer (I) comprises at least one polymer (C) including a structural unit derived from a graft monomer selected from the group consisting of unsaturated carboxylic acids and derivatives thereof.

Such a polypropylene adhesive layer (I) comprising the polymer (C) can facilitate production of a laminate having high adhesiveness to a substrate comprising a polyester resin.

The adhesive layer (I) may comprise one or more polymers (C).

Examples of a polymer copolymerizable with the graft monomer (hereinafter, also referred to as "trunk polymer". The trunk polymer is also the structural unit excluding the structural unit derived from the graft monomer) include homopolymers of α-olefin having 2 to 24 carbon atoms, copolymers of two or more α-olefins having 2 to 24 carbon atoms, and copolymers of one or more α-olefins having 2 to 24 carbon atoms and compounds copolymerizable with the olefins. For example, among these homopolypropylene, the copolymer (A) and the copolymer (B) are preferred.

The copolymer may be a random copolymer, or may be a block copolymer. The stereoregularity and molecular weight of the trunk polymer is not particularly limited within a range not impairing the advantageous effects of the invention.

The method of preparing the trunk polymer is not particularly limited, and examples thereof include well-known methods using a well-known catalyst such as a Ziegler-Natta catalyst or a metallocene catalyst. A commercially available resin can also be used as it is.

Examples of the graft monomer include unsaturated compounds having one or more carboxylic acid groups, esters of unsaturated carboxylic acid compounds having a carboxylic acid group and alkyl alcohols, and unsaturated compounds having one or more anhydrous carboxylic acid groups (such as anhydrides of unsaturated dicarboxylic acids).

Examples of unsaturated groups include a vinyl group, a vinylene group, and unsaturated cyclic hydrocarbon groups.

As the graft monomer, an unsaturated dicarboxylic acid or an acid anhydride thereof is suitable. Particularly, maleic acid, nadic acid, or an acid anhydride thereof is preferably used.

These graft monomers may be used alone or two or more thereof may be used.

The graft amount of the graft monomer in the polymer (C) (amount of a structural unit derived from the unsaturated carboxylic acid and/or derivatives thereof in the polymer (C)) is preferably 0.01 to 5 parts by weight, more preferably 0.05 to 3.5 parts by weight relative to 100 parts by weight of the trunk polymer.

A graft amount within this range can facilitate production of an adhesive layer having a good balance between formability and adhesiveness.

The method of the preparing the graft monomer is not particularly limited and a conventionally known graft polymerization method such as a solution method or a melt kneading method can be used. Examples thereof include a method of melting the trunk polymer, and adding the graft monomer thereto to perform a graft reaction, or a method of dissolving the trunk polymer in a solvent to prepare a solution, and adding the graft monomer thereto to perform a graft reaction.

The amount of the polymer (C) contained in the polypropylene adhesive layer (I) is preferably 1 to 20 parts by weight, more preferably 3 to 10 parts by weight relative to 100 parts by weight of the total of the copolymers (A) and (B), for example, to facilitate production of a laminate having high adhesiveness to a substrate comprising a polyester resin.

[Other Components]

For example, in order to adjust the rigidity, the adhesive layer (I) may appropriately contain a propylene homopolymer, a copolymer other than the copolymers (A) to (C), and/or a styrene elastomer in a range not impairing the advantageous effects of the invention. For example, in order to adjust the formability, the adhesive layer (I) may appropriately contain, for example, low density polyethylene (LDPE).

Besides, the adhesive layer (I) may contain known additives such as antioxidants, ultraviolet absorbing agents, neutralizers, nucleating agents, light stabilizers, antistatic agents, anti-blocking agents, lubricants, tackifiers, odor adsorbents, antibacterial agents, pigments, inorganic or organic fillers, and a variety of synthetic resins as needed.

[Method of Forming Adhesive Layer (I)]

The method of forming the adhesive layer (I) is not particularly limited. Examples the method include a method of preparing an adhesive comprising the polymers (A) to (C) and other components described above as needed, and forming an adhesive layer using the adhesive by a conventionally known method of producing a laminate (for example, a method of co-extruding raw materials for the layers forming the present laminate; a method of applying the adhesive onto one or both of two layers to be bonded with the adhesive layer (I), disposing the two layers in contact with each other with the adhesive interposed therebetween, and hot pressing the two layers; or a method of forming an adhesive layer (I) preliminary formed into a film or sheet from the adhesive, and melting the adhesive layer (I) in the state where the adhesive layer (I) is in contact with the substrate layer (II)).

Examples of a method of preparing the adhesive include a method of mixing the polymers (A) to (C) by a variety of known methods such as using a Henschel mixer, a V blender, a ribbon blender, or a tumbler blender; and a method of melt kneading the polymers (A) to (C) by a variety of known methods such as using a single screw extruder, a twin screw extruder, a kneader, or a Banbury mixer. The mixture prepared by the mixing or the melt kneaded product prepared by the melt kneading may be granulated or pulverized as needed.

The MFR of the adhesive according to ASTM D1238 (230° C., load of 2.16 kg) is not particularly limited, and the MFR is preferably 0.1 to 100 g/10 min, more preferably 0.5 to 50 g/10 min because such an adhesive can provide, for example, an adhesive layer (I) having high formability.

The density of the adhesive measured according to JIS K7112 is preferably 0.85 to 0.91 g/cm$^3$, more preferably 0.86 to 0.89 g/cm$^3$.

<Substrate Layer (II)>

The substrate layer (II) is not particularly limited as long as it includes a polyester resin. The substrate layer (II) may be a layer having printing properties, easy adhesiveness, and deposition properties given by controlling the composition of the raw materials for forming the substrate layer (II).

Examples of the polyester resin specifically include resins prepared through polycondensation of dicarboxylic acids (such as isophthalic acid, phthalic acid, terephthalic acid, 2,6-naphthalene dicarboxylic acid, adipic acid, and sebacic acid) or oxycarboxylic acids (such as p-oxybenzoic acid) with aliphatic glycols (such as ethylene glycol, propylene glycol, butane diol, diethylene glycol, 1,4-cyclohexanedimethanol, and neopentyl glycol).

These dicarboxylic acids, oxycarboxylic acids, and aliphatic glycols each may be used alone or two or more thereof may be used.

Representative examples of the polyester resin include PET, polyethylene-2,6-naphthalene dicarboxylate (PEN), and polybutylene terephthalate (PBT). The resin may be a copolymer comprising a homopolymer and a third component (30 mol % or less).

The substrate layer (II) may be a layer prepared by a method comprising a stretch step according to desired applications.

The thickness of the substrate layer (II) is not particularly limited, and the thickness can be appropriately selected according to desired applications and is preferably 2 to 500 µm, more preferably 5 to 300 µm.

<Other Layers>

The present laminate is not particularly limited as long as it includes the adhesive layer (I) and the substrate layer (II). A preferred laminate includes the adhesive layer (I) in contact with the substrate layer (II), for example, to more significantly demonstrate the advantageous effects of the invention.

The present laminate is usually a laminate including the substrate layer (II), the adhesive layer (I), and a layer X in sequence, and may further include another layer Y disposed on the substrate layer (II) opposite to the adhesive layer (I) and/or on the layer X opposite to the adhesive layer (I).

The present laminate may include single layers of the adhesive layer (I), the substrate layer (II), the layer X, and the layer Y, or may include two or more layers thereof.

The layers X and Y are not particularly limited as long as a layer to be laminated with the substrate layer (II). Examples thereof include thermoplastic resin layers, gas barrier layers, and inorganic substance layers.

Examples of the thermoplastic resin layers include layers comprising a variety of thermoplastic resins other than the gas barrier layers described below, such as layers comprising polyolefins, polyesters, polycarbonates, polyacrylates, or polyurethanes. Among these, preferred are propylene resin layers, for example, to more significantly demonstrate the advantageous effects of the invention.

If a layer comprising a polyester is used as the thermoplastic resin layer, the layer may be the same layer as the substrate layer (II).

Examples of the gas barrier layers include layers comprising a variety of known resins having gas barrier properties, such as layers comprising a resin having high barrier properties such as saponified products of ethylene-vinyl acetate copolymer (EVOHs), polyamide resins (PAs), polyvinylidene chloride resins or polyacrylonitriles.

Examples of the EVOHs include polymers preferably prepared through saponification of ethylene-vinyl acetate copolymers (ethylene content: 15 to 70 mol %) and having a degree of saponification of 90 to 100%.

Examples of the PAs include nylon 6, nylon 66, nylon 610, nylon 12, nylon 11, MXD nylon, amorphous nylon, and copolymerized nylons.

The inorganic substance layer is preferably disposed on the surface of the substrate layer (II).

The inorganic substance layer is not particularly limited as long as it does not impair the advantageous effects of the invention. Examples thereof include layers composed of metals containing one or more elements selected from gold (Au), copper (Cu), iron (Fe), chromium (Cr), zinc (Zn), cobalt (Co), aluminum (Al), titanium (Ti), tin (Sn), indium (In), magnesium (Mg), molybdenum (Mo), manganese (Mn) and silicon (Si); and layers composed of inorganic compounds such as oxides, nitrides, oxynitrides, sulfides, phosphides, phosphorus oxides, phosphorus nitrides, and phosphorus oxynitrides containing one or more of the elements listed above. As the inorganic substances, preferred, for example, are metals and metal oxides.

The metal is not particularly limited as long as it does not impair the advantageous effects of the invention. Preferred metals, for example, are aluminum, iron, stainless steel, and titanium. Preferred metal oxides, for example, are oxides of these metals listed above.

If a substrate layer (II) having a surface coated with the inorganic substance layer is used, the adhesive layer (I) may be in contact with the surface of the substrate layer (II) having a deposited inorganic substance, or may be in contact with the substrate layer (II). Preferably, the adhesive layer is in contact with the substrate layer (II).

If the inorganic substance layer is disposed on the outer side of the laminate, one or more protective layers may be laminated thereon.

<Method of Producing the Present Laminate>

A method of producing the present laminate may be performed by a conventionally known method of producing a laminate. Examples thereof include a method of co-extruding raw materials for the layers forming the present laminate; a method of disposing the adhesive on one or both of two layers to be bonded with the adhesive layer (I), disposing the two layers in contact with each other with the adhesive interposed therebetween, and hot pressing the two layers; and a method of forming an adhesive layer (I) preliminary formed into a film or sheet from the adhesive, and melting the adhesive layer (I) in the state where the adhesive layer (I) is in contact with the substrate layer (II).

The method of producing the present laminate is preferably melt extrusion molding. Examples thereof include general methods industrially performed, such as a casting method, an inflation method, a heat lamination method, an extrusion lamination method, an extrusion sandwich lamination method, and a dry lamination method using an anchor coating material.

The shape of the present laminate is not particularly limited, and may be any shape such as a sheet, a film, a tube, or a bag shape. The shape may be appropriately selected according to desired applications.

The thickness of the present laminate is not particularly limited and may be appropriately selected according to desired applications; however, the thickness is preferably 10 µm to 1000 µm, more preferably 20 µm to 700 µm.

<Heat Treatment Step>

The present method comprises a step of heat treating the resulting laminate at 80 to 140° C. for 5 to 120 minutes. Examples thereof specifically include a known hot water treatment step for sterilizing the laminate, and an annealing step for relaxing residual stress during molding.

The present laminate has high adhesiveness after the heat treatment, particularly can have higher adhesiveness after the heat treatment than the initial adhesiveness. For this reason, even if such a heat treatment required according to the application of the present laminate is performed, the laminate has sufficient adhesiveness, less leakage of the contents, and high durability.

Examples of the hot water treatment include a retort treatment and a boil treatment. Examples of the retort treatment include a method of sterilizing microorganisms such as mold, yeasts, and bacteria under pressure to store, for example, food products in general. Specifically, examples thereof include a method of performing a sterilization treatment under pressure using a standard retort tank, usually under a condition at 105 to 140° C. under 0.15 to 0.3 MPa for 10 to 120 minutes although the treatment temperature depends on the contents or the container (laminate) to be used and the generalization is difficult.

Examples of the boil treatment include a method of sterilizing, for example, food products with hygrothermal for storage. Although it depends on the contents, examples of the boil treatment include a method of performing a sterilizing treatment of a laminate packaging, for example, a food product under an atmospheric pressure at 60 to 100° C. for 10 to 120 minutes.

EXAMPLES

Hereinafter, the present invention will be more specifically described by way of Examples and Comparative Examples, but the present invention is not limited by these Examples unless it is out of the scope of the gist.

[Initial Adhesive Strength]

Three-layer laminates of polypropylene/adhesive layer/PET before heat treatment, which were obtained in Examples and Comparative Examples, were stored at normal temperature for one week. The interlayer adhesive strength (initial adhesive strength) of each PET layer and its corresponding adhesive layer was then evaluated by the T-peel method. The evaluation was performed using a tensile tester under an atmosphere at 23° C. The crosshead speed was 50 mm/min.

[Adhesive Strength after Heat Treatment]

The adhesive strength was measured by the same method as that in the initial adhesive strength except that the interlayer adhesive strength of the laminate after heat treatment (adhesive strength after heat treatment) was measured rather than the laminate before heat treatment.

[Melt Flow Rate (MFR)]

The MFR was measured according to ASTM D1238 at 230° C. under a load of 2.16 kg.

[Density]

The density was measured according to JIS K7112.

[Melting Point (Tm)]

The Tm of a raw material for the following adhesive was measured according to the following method by differential scanning calorimetry.

About 5 mg of a sample was filled into a dedicated aluminum pan. Using DSC Pyris 1 or DSC 7 made by PerkinElmer Inc., the sample was heated from 30° C. to 200° C. at 320° C./min, and was kept at 200° C. for 5 minutes. The sample was then cooled from 200° C. to 30° C. at 10° C./min, and then was kept at 30° C. for another 5 minutes. The sample was then heated at 10° C./min. From the endothermic curve obtained in this heating, the melting point was determined.

If several peaks were detected during the measurement, the peak temperature detected at the highest temperature was defined as the melting point (Tm).

[Composition of Polymer]

The contents of the structural unit derived from propylene and α-olefin in the copolymer used as a raw material for the following adhesive were measured by $^{13}$C-NMR under the following condition using the following apparatus.

The contents of propylene and α-olefin were determined using a JECX 400P nuclear magnetic resonance apparatus made by JEOL, Ltd. under the following condition: A deuterated ortho-dichlorobenzene/hexadeuterobenzene (80/20 vol %) mixed solvent was used as a solvent, the sample concentration was 60 mg/0.6 mL, the temperature for measurement was 120° C., the observation nuclear was $^{13}$C (100 MHz), the sequence was single-pulse proton decoupling, the pulse width was 4.62 microseconds (45° pulse), the repetition time was 5.5 seconds, the number of integrations was 8000 times, and a reference value of chemical shift was 29.73 ppm.

[Amount of Structural Unit Derived from Graft Monomer]

The amount (graft amount) of the structural unit derived from the graft monomer was determined as follows: The intensity of the peak derived from the structural unit (1790 $cm^{-1}$ if maleic anhydride was used) was measured with an infrared absorption analyzer, and the amount of the structural unit was determined using the calibration curve preliminarily created.

[Weight Average Molecular Weight (Mw) and Molecular Weight Distribution (Mw/Mn)]

The Mw and Mw/Mn of the copolymer used as the raw material for the following adhesive were measured using a liquid chromatography (made by TA Instruments-Waters LLC, Alliance/GPC2000) with columns connected in series (two TSKgel GMH6-HT columns and two TSKgel GMH6-HTL columns all made by Tosoh Corporation and having a column size, i.e., a diameter of 7.5 mm and a length of 300 mm). The medium of the mobile phase used was o-dichlorobenzene containing 0.025% by weight of an antioxidant (butylhydroxytoluene, made by Takeda Pharmaceutical Company Limited), and the measurement was performed under a condition at a sample concentration of 0.15% (V/W), a flow rate of 1.0 mL/min, and a temperature of 140° C. In case that a molecular weight of the copolymer of 500 to 20,600,000, standard polystyrene made by Tosoh Corporation was used here.

The obtained chromatogram was analyzed by a known method using data processing software Empower 2 made by TA Instruments-Waters LLC to calculate the number average molecular weight (Mn), the Mw, and the Mw/Mn using the calibration curve created from the standard polystyrene samples.

[Solid Viscoelasticity: Measurement of Temperature Dispersion]

Measurement was performed using sheets of adhesives prepared in Example 1 and Comparative Example 1 by heating the adhesives at 200° C. for 5 minutes, and cooling them for one minute. The measurement was performed with an apparatus RSA-III (made by TA Instruments, Inc.) in a tensile mode. In this measurement, the storage elastic modulus (E') [Pa] was measured under a nitrogen environment at a frequency of 1 Hz while the sheets were being heated from −70° C. to 150° C. at 3° C./min.

To check the influences by heat treatment, the storage elastic modulus (E') was measured in the same manner as above except that a sheet prepared in the same manner as above and heat treated at 121° C. for 30 minutes under an air environment was used.

(Polyolefins Used)

The polyolefins used in Examples and Comparative Examples are listed below. These polyolefins all were prepared through polymerization according to a normal method, unless otherwise specified.

[Propylene Copolymer (A)]
  PER-1: propylene-ethylene random copolymer
    (MFR=1.4 g/10 min, density=0.86 g/cm$^3$, ethylene content=21 mol %, butene content=0 mol %, melting point=108° C., Mw/Mn=2.1)
  PER-2: propylene-ethylene random copolymer
    (MFR=8.0 g/10 min, density=0.86 g/cm$^3$, ethylene content=12 mol %, butene content=0 mol %, melting point=77° C., Mw/Mn=2.2)
  PER-3: propylene-ethylene random copolymer
    (MFR=8.0 g/10 min, density=0.86 g/cm$^3$, ethylene content=5 mol %, butene content=0 mol %, melting point=108° C., Mw/Mn=2.2)
[Copolymer (B) Having Structural Unit Derived from Butene]
  BPR-1: butene-propylene random copolymer
    (MFR=9.0 g/10 min, density=0.89 g/cm$^3$, butene content=74 mol %, melting point=58° C., Mw/Mn=2.2)
  BPR-2: butene-propylene random copolymer
    (MFR=3.0 g/10 min, density=0.90 g/cm$^3$, butene content=99 mol %, melting point=110° C., Mw/Mn=2.2)
  PBR-1: propylene-butene random copolymer
    (MFR=7.0 g/10 min, density=0.88 g/cm$^3$, butene content=26 mol %, melting point=75° C., Mw/Mn=2.2)
  PBR-2: propylene-butene random copolymer
    (MFR=7.0 g/10 min, density=0.89 g/cm$^3$, butene content=15 mol %, melting point=98° C., Mw/Mn=2.2)
[Polymer (C) Including Structural Unit Derived from Graft Monomer]
  Modified PP: modified isotactic homopolypropylene
    (MFR=100 g/10 min, density=0.90 g/cm$^3$, graft amount of maleic anhydride=3.0 wt %)

Example 1

<Preparation of Propylene Adhesive>
PER-1 (80% by weight), BPR-1 (15% by weight), and modified PP (5% by weight) were melt kneaded using a single screw extruder at 230° C. to yield a propylene adhesive. The resulting propylene adhesive had an MFR of 2.3 g/10 min and a density of 0.87 g/cm$^3$.
<Preparation of Three-Layer Laminate>
The layers configured below were co-extruded under the following condition to mold a three-layer laminate.

[Inner Layer]
As a polyester resin (hereinafter, referred to as "PET"), J125 (homoPET) made by Mitsui Chemicals, Inc. was extruded from a screw having a diameter of 40 mm and an L/D of 28 at 275° C.
[Outer Layer and Intermediate Layer]
A commercially available polypropylene (made by Prime Polymer Co., Ltd., F327, MFR: 7 g/10 min) as an outer layer and the resulting propylene adhesive as an intermediate layer were extruded from a screw having a diameter of 50 mm and an effective length L/D of 28 at 230° C.
[Condition for Molding Heat Treated Laminate]
The resins extruded as the outer layer, the inner layer, and the intermediate layer were laminated in the order of the inner layer, the intermediate layer, and the outer layer in sequence within a feed block. The dice temperature was 275° C. The laminate of the resins co-extruded into films having a thickness of about 50 μm was cooled with a chill roll, and was drawn at a rate of 20 m/min. The thicknesses of the outer layer (polypropylene), the intermediate layer (adhesive), and the inner layer (PET) were 20 μm, 10 μm, and 20 μm, respectively.

The resulting laminate was stored at normal temperature for one week, and then was subjected to a retort treatment (heat treatment) under hot water at 121° C. for 30 minutes to yield a laminate.

The physical properties of the resulting adhesive and laminate are shown in Table 1.

Examples 2 to 8

Propylene adhesives were prepared in the same manner as in Example 1 except that the formulation was changed to those shown in Table 1, and three-layer laminates were prepared by the same method as that in Example 1. The physical properties of the resulting adhesives and laminates are shown in Table 1.

Comparative Example 1

An adhesive was prepared in the same manner as in Example 1 except that PER-2 (95% by weight) and modified PP (5% by weight) were used, and a three-layer laminate was prepared by the same method as that in Example 1. The physical properties of the resulting adhesive and laminate are shown in Table 1.

TABLE 1

|  |  | Example 1 | Example 2 | Example 3 | Example 4 | Example 5 | Example 6 | Example 7 | Example 8 | Comparative Example 1 |
|---|---|---|---|---|---|---|---|---|---|---|
| PER-1 | Wt % | 80 | 85 | 90 | 80 | 80 | 80 |  |  |  |
| PER-2 | Wt % |  |  |  |  |  |  | 80 |  | 95 |
| PER-3 | Wt % |  |  |  |  |  |  |  | 80 |  |
| BPR-1 | Wt % | 15 | 10 | 5 |  |  |  | 15 | 15 |  |
| BPR-2 | Wt % |  |  |  | 15 |  |  |  |  |  |
| PBR-1 | Wt % |  |  |  |  | 15 |  |  |  |  |
| PBR-2 | Wt % |  |  |  |  |  | 15 |  |  |  |
| Modified PP | Wt % | 5 | 5 | 5 | 5 | 5 | 5 | 5 | 5 | 5 |
| MFR | g/10 min | 2.3 | 2.1 | 1.9 | 1.9 | 2.2 | 2.2 | 9.2 | 5.3 | 9.1 |
| Density | g/cm$^3$ | 0.87 | 0.87 | 0.86 | 0.87 | 0.87 | 0.87 | 0.88 | 0.89 | 0.88 |
| Initial adhesive strength | N/15 mm | 2.2 | 2.0 | 2.5 | 2.3 | 2.1 | 2.5 | 2.0 | 1.9 | 1.6 |
| Adhesive strength after heat treatment | N/15 mm | 3.1 | 2.4 | 2.4 | 2.5 | 2.7 | 2.6 | 1.8 | 1.9 | 1.0 |

The graph of the storage elastic modulus (E') of the sheet formed from the adhesive prepared in Example 1 is shown in FIG. 1, and the graph of the storage elastic modulus (E') of the sheet formed from the adhesive prepared in Comparative Example 1 is shown in FIG. 2. In FIGS. 1 and 2, the solid line represents the graph of the sheet prepared above while the dotted line represents the graph of the sheet heat treated under an air environment at 121° C. for 30 minutes.

When the adhesive prepared in Example 1 was used, the curve of the storage elastic modulus (E') shows substantially the same behavior before and after the heat treatment. This verifies that the adhesive prepared in Example 1 had a stable adhesive strength even after the heat treatment. In contrast, when the adhesive prepared in Comparative Example 1 was used, the storage elastic modulus (E') of the sheet after the heat treatment sharply reduced near a temperature of about 50 to 100° C., and the adhesive prepared in Comparative Example 1 did not exhibit a stable adhesive strength.

The invention claimed is:

1. A method of producing a laminate comprising a polypropylene adhesive layer (I) and a substrate layer (II), the method comprising:
   a heat treatment step of performing a heat treatment under a temperature condition of 80 to 140° C. for 5 to 120 minutes,
   wherein the laminate satisfies at least the following requirements (1) to (5):
   (1) the adhesive layer (I) comprises 97 to 70% by weight of a propylene copolymer (A), and 3 to 30% by weight of a copolymer (B) having a structural unit derived from butene relative to 100% by weight of a total of the propylene copolymer (A) and the copolymer (B),
   (2) the propylene copolymer (A) has a melting point of 70 to 120° C. measured with a differential scanning calorimeter, and includes less than 1 mol % of a structural unit derived from butene,
   (3) the copolymer (B) has a melting point of 130° C. or less measured with a differential scanning calorimeter, and includes 1 mol % or more of the structural unit derived from butene,
   (4) the adhesive layer (I) comprises a polymer (C) having a structural unit derived from at least one graft monomer selected from the group consisting of unsaturated carboxylic acids and derivatives thereof, and
   (5) the substrate layer (II) comprises a polyester resin.

2. The method according to claim 1, wherein the heat treatment step is performed under an environment containing water.

3. The method according to claim 1, wherein a graft amount of the at least one graft monomer in the polymer (C) is 0.001 to 5 parts by weight relative to 100 parts by weight of a structural unit excluding the structural unit derived from the at least one graft monomer.

4. The method according to claim 1, wherein the copolymer (B) includes 10 to 99 mol % of the structural unit derived from butene.

5. The method according to claim 1, wherein the laminate further includes a gas barrier layer containing at least one selected from the group consisting of saponified products of an ethylene-vinyl acetate copolymer and polyamides.

6. The method according to claim 1, wherein the substrate layer (II) is a layer prepared by a method comprising a stretch step.

7. The method according to claim 1, wherein the substrate layer (II) includes an inorganic substance layer on a surface thereof.

8. The method according to claim 1, wherein the substrate layer (II) contains a polyethylene terephthalate resin.

9. The method according to claim 1, wherein the adhesive layer (I) contains 5 to 30% by mass of a component soluble in normal decane at 80° C., and
   the soluble component includes 1 mol % or more of a structural unit derived from butene.

* * * * *